（12）United States Patent
Jochimski (10) Patent No.: US 10,282,446 B2
(45) Date of Patent: May 7, 2019

(54) DYNAMIC SELECTION OF SOURCE TABLE FOR DB ROLLUP AGGREGATION AND QUERY REWRITE BASED ON MODEL DRIVEN DEFINITIONS AND CARDINALITY ESTIMATES

(71) Applicant: Tektronix, Inc., Beaverton, OR (US)

(72) Inventor: Tomasz Jochimski, Dublin (IE)

(73) Assignee: NetScout Systems Texas, LLC, Westford, MA (US)

( * ) Notice: Subject to any disclaimer, the term of this patent is extended or adjusted under 35 U.S.C. 154(b) by 339 days.

(21) Appl. No.: 14/319,015

(22) Filed: Jun. 30, 2014

(65) Prior Publication Data

US 2015/0379080 A1    Dec. 31, 2015

(51) Int. Cl.
*G06F 17/30* (2006.01)

(52) U.S. Cl.
CPC .... *G06F 17/30448* (2013.01); *G06F 17/3053* (2013.01); *G06F 17/30339* (2013.01); *G06F 17/30457* (2013.01); *G06F 17/30592* (2013.01)

(58) Field of Classification Search
CPC ......... G06F 17/30448; G06F 17/30339; G06F 17/30457; G06F 17/3053; G06F 17/30592
USPC ........................................................ 707/600
See application file for complete search history.

(56) References Cited

U.S. PATENT DOCUMENTS

| | | | |
|---|---|---|---|
| 6,199,063 B1 | 3/2001 | Colby et al. | |
| 2001/0013030 A1* | 8/2001 | Colby ............... | G06F 17/30312 |
| 2002/0138460 A1 | 9/2002 | Cochrane et al. | |
| 2004/0122814 A1 | 6/2004 | Zhang et al. | |
| 2004/0122844 A1* | 6/2004 | Malloy ............. | G06F 17/30592 |
| 2006/0161517 A1* | 7/2006 | Bhattacharjee ... | G06F 17/30306 |
| 2009/0300002 A1* | 12/2009 | Thomas ............ | G06F 17/30522 |
| 2010/0030731 A1 | 2/2010 | Gui et al. | |
| 2012/0265728 A1* | 10/2012 | Plattner ............ | G06F 17/30592 |
| | | | 707/607 |

FOREIGN PATENT DOCUMENTS

WO     WO-9950762 A1     10/1999

OTHER PUBLICATIONS

Office Action for European Patent Application No. 15174181.6, dated Mar. 16, 2017.
Extended European Search Report for European Patent Application No. 15174181.6, dated Nov. 15, 2005.

* cited by examiner

*Primary Examiner* — Mahesh H Dwivedi
*Assistant Examiner* — Johnese T Johnson
(74) *Attorney, Agent, or Firm* — Locke Lord LLP; Scott D. Wofsy; Christopher J. Capelli (57) ABSTRACT

A method for optimizing data access in a data warehouse having a model driven architecture is provided. A data model for storing time series measurement data representing a plurality of dimensions and measurements is received. The data model includes one or more aggregation tables. A query having one or more predicates is received from a user. The one or more predicates are analyzed to determine whether the received query can be optimized using the existing aggregation tables. The received query is optimized using the aggregation tables, in response to determining that such query optimization is possible.

13 Claims, 5 Drawing Sheets

FIG. 5 though it may have many processing steps and structures. An illustrative embodiment of the present invention provides a solution for making the querying of data warehouses having a model driven architecture more efficient.

DYNAMIC SELECTION OF SOURCE TABLE FOR DB ROLLUP AGGREGATION AND QUERY REWRITE BASED ON MODEL DRIVEN DEFINITIONS AND CARDINALITY ESTIMATES

FIELD OF THE INVENTION

Embodiments of the present invention relate to computer databases and, more particularly, to providing optimized data access in a data warehouse having a model driven architecture by means of targeted query rewriting.

BACKGROUND OF THE INVENTION

Databases are used to store information for an innumerable number of applications, including various commercial, industrial, technical, scientific and educational applications. Databases are generally organized into tables and fields and may be searched via database queries. A particular database may consist of many tables, and the tables in a database are generally related to each other.

A data warehouse is a repository of an enterprise's electronically stored data, designed to facilitate reporting and analysis. It is also a nonvolatile data repository that houses large amounts of historical data. Data warehousing and associated processing mechanisms, such as Online Analytical Processing (OLAP), Relational OLAP (ROLAP), Multidimensional OLAP (MOLAP), and Hybrid OLAP (HOLAP), are common technologies used to support business decisions and data analysis. One of the leading approaches used to store data in a data warehouse is the dimensional approach. In a dimensional approach, transaction data is partitioned into either "facts", which are generally numeric transaction data such as net sales, quantity sold, gross sales, etc., or "dimensions", which are the reference information that gives context to the facts.

The foundation of the enterprise data warehouse is a comprehensive and responsive logical data model. A logical data model is a representation of the way data is organized in a data warehouse environment. The logical data model specifically defines which individual data elements can be stored and how they relate to one another to provide a model of the business information. The data model ultimately defines which business questions can be answered from the data warehouse and thus determines the business value of the entire business decision support system.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for optimizing data access in a data warehouse having a model driven architecture is provided. A data model for storing time series measurement data representing a plurality of dimensions and measurements is received. The data model includes one or more aggregation tables. A query having one or more predicates is received from a user. The one or more predicates are analyzed to determine whether the received query can be optimized using the existing aggregation tables. The received query is optimized using the aggregation tables, in response to determining that such query optimization is possible.

In another aspect, a computer program product for optimizing data access in a data warehouse having a model driven architecture is provided. The computer program product comprises one or more computer-readable storage devices and a plurality of program instructions stored on at least one of the one or more computer-readable storage devices. The plurality of program instructions includes program instructions to receive a data model for storing time series measurement data representing a plurality of dimensions and measurements. The data model includes one or more aggregation tables. The plurality of program instructions further includes program instructions to receive a query having one or more predicates from a user. The plurality of program instructions further includes program instructions to analyze the one or more predicates to determine whether the received query can be optimized using the one or more aggregation tables. The plurality of program instructions further includes program instructions to optimize the received query using the one or more aggregation tables, in response to determining that the received query can be optimized.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may differ from the actual publication dates which may need to be independently confirmed.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

Traditional Relational Database Management System (RDBMS) platforms often provide various ways to rewrite queries. For example, Oracle provides query rewrite techniques associated with materialized views. A materialized view is a body of data constructed from "source" data stored in one or more "source" tables. A source table may be local or remote relative to the materialized view. A materialized view can be refreshed on a periodic basis to reflect the current state of its corresponding source tables.

One type of materialized view is a snapshot. A snapshot is a materialized view that may be constructed from a portion of the base data. Snapshots are useful for replicating a portion of the source data for a user who only needs to view or access that portion. For example, sales associates are assigned territories by zip code, and they would like to keep a copy of only the relevant sales information in a database on their laptop computers. Thus, if a sales associate Johnson is assigned only to zip codes 0690 and above, then Johnson is only interested in customers, orders, and order lines for zip code 0690 and above. Consequently, Johnson creates a snapshot that reflects only source data relevant to his zip code.

Another use of materialized views is to store the results of often-repeated queries in materialized views. For example, a business may periodically generate reports that summarize the business facts stored in a data warehouse, such as: "What have been the best selling brands of mobile devices in each of our sales regions, during the past six months?" By storing the results of queries in a materialized view, the costly join operations required to generate the results do not have to be performed every time the queries are issued. Rather, the database server responds to the queries by simply retrieving pre-computed data in the materialized view. Through a process known as query rewrite, a query can be optimized to recognize and use existing materialized views that could answer the query. Thus rewritten queries can be executed more efficiently.

Although the use of materialized views typically reduces the necessary amounts of I/O operations and CPU cycles for the single query execution, the following technical problems and/or disadvantages arise. First, the content of the materialized view exactly matches the content of the source table. In other words the retention period of data is always exactly the same, making it impossible to keep data in the materialized view for a longer period of time. Second, the functionality of such materialized views depends heavily on the underlying technology (i.e., Oracle RDBMS), thereby tying database related applications to a particular database server from a specific vendor. Third, in many cases, construction and modification of these views can be prohibitively complex and expensive (especially, creating new views on pre-existing tables having many billions if not trillions of rows).

In one aspect, various embodiments of the present invention overcome these shortcomings and disadvantages. In another aspect, various embodiments of the present invention provide further advantages. Described embodiments of the present invention are directed to a cost effective method of optimizing data access in a data warehouse having a model driven architecture with rollup aggregations. One of the most fundamental principles of the multidimensional database is the idea of aggregation. The most common aggregation is called a rollup aggregation. This type is relatively easy to compute: e.g. taking daily sales totals and rolling them up into an aggregation table (e.g., monthly sales table). However, currently, at least in model driven systems, it is necessary to configure such rollups individually, specifying the source table for each rollup. This is typically an involved manual process, depending on the size of the system and number of possible options to select from. Manual configuration typically fails to address the dynamic nature of data feed characteristics. Additionally, if a model driven system includes a large number of models manual configuration of rollup aggregation can become highly prohibitive.

Attempts to apply conventional manual rollup aggregation configuration approaches in a data warehouse having a complex model driven architecture would incur additional post-deployment costs, as models are likely to change after initial deployment. Described embodiments of the present invention overcome these challenges by utilizing a dynamic approach of selecting the most appropriate source table for each query without requiring any additional configuration changes.

Figure 1:
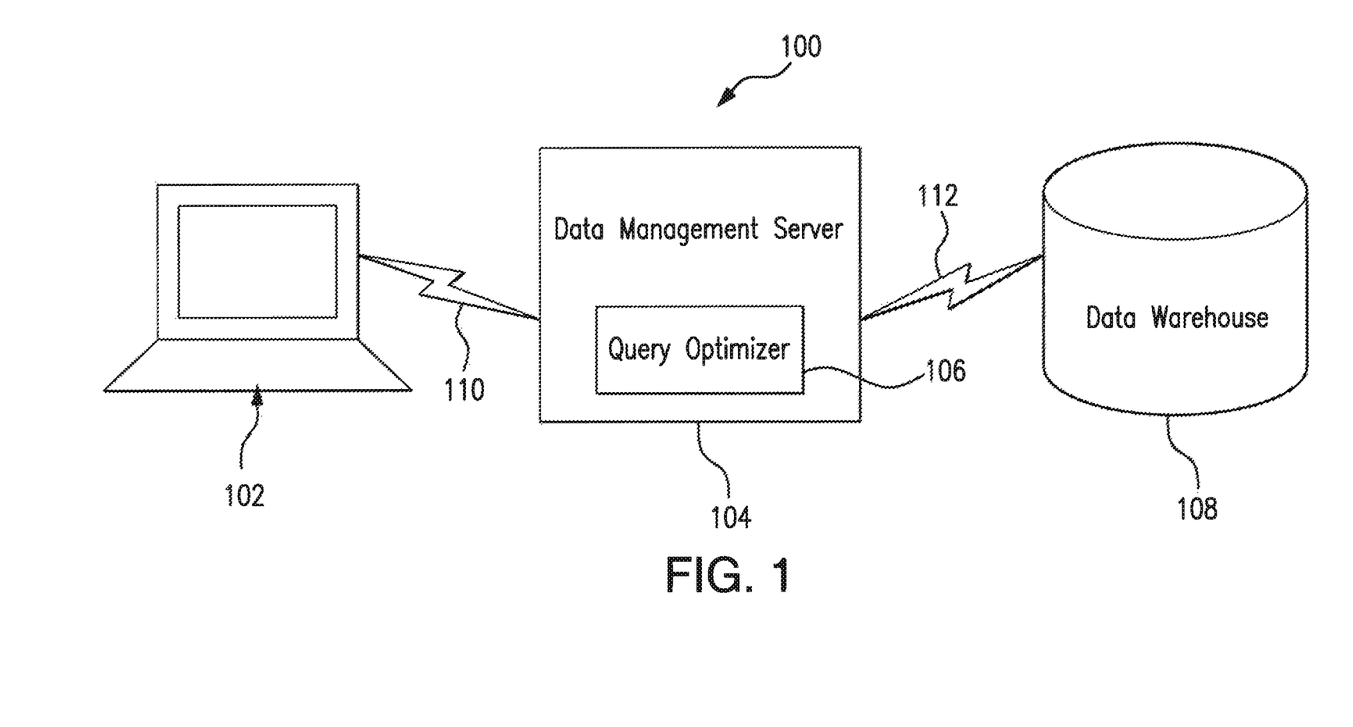
FIG. 1 is a block diagram of a system in accordance with embodiments of the present invention.

Referring to FIG. 1 of the drawings, there is shown a block diagram of a system 100 in accordance with one embodiment of the present invention. System 100 includes a client computer 102 that receives and displays a user interface ("UI") that includes one or more query components to facilitate a user in locating desired information. Client computer 102 includes a processor and memory for storing instructions (not shown). The memory can be any type of memory or other computer readable media that stores instructions that are executed by the processor. A computer readable storage medium may be, for example, but not limited to, an electronic, magnetic, optical, electromagnetic, infrared, or semiconductor system, apparatus, or device, or any suitable combination of the foregoing. Generally speaking, client device 102 can be any type of computer or other computing device that can generate and display an Internet browser window or other type of graphical user interface ("GUI").

Figure 5:
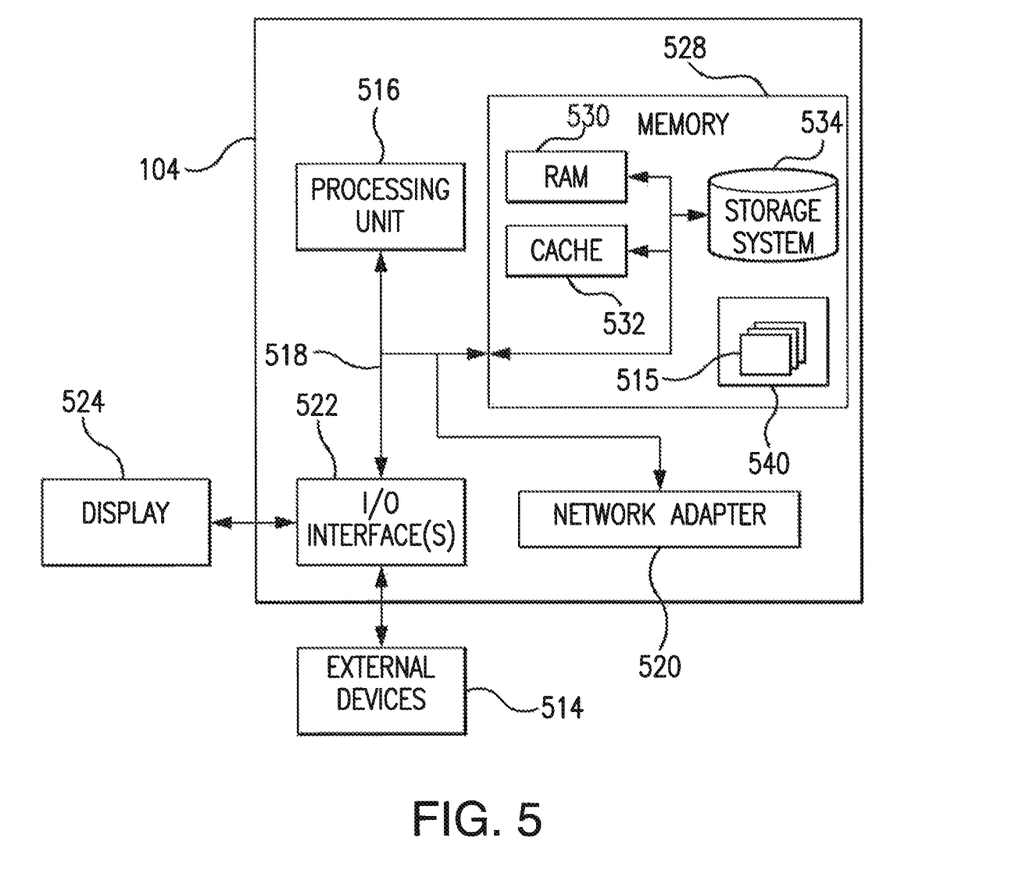
FIG. 5 is a block diagram illustrating a typical warehouse management server that may be employed to implement processing functionality described herein, according to some embodiments.

Client 102 is coupled to a data management server computer 104 via a link 110. Link 110 is any type of local or network connection that enables client device 102 to communicate and exchange data with data management server 104. In one embodiment, link 110 is the Internet. FIG. 5 is a schematic block diagram of an example data management server 104 that may be used with one or more embodiments described herein. In an exemplary embodiment data management server 104 may receive data from customer data servers (not shown in FIG. 1). Data management server 104 creates, for example, one feed per data source in the form of a flat file.

In an embodiment of the present invention, data management server 104 may send the flat file to data warehouse 108. Data warehouse 108 may convert the flat file into, for example, relational database table elements for storage. Data management server 104 can also include metadata dictionaries and other software modules, such as, but not limited to a query optimizer 106. The query optimizer 106 may generally be a software module or application that determines the most efficient way to execute a query. The query optimizer 106 considers the possible query plans for a given input query, and attempts to determine which of those plans will be the most efficient.

Server 104 is coupled, either locally or remotely, to a data warehouse 108 via a link 112. Data warehouse systems, such as exemplary data warehouse 108, are very common among organizations for the purpose of monitoring business activities. Some companies have also built additional business applications, such as OLAP applications, on top of their enterprise data warehouse systems in order to help derive intricate business metrics or to answer ad-hoc business questions. Data warehouse 108 can store a large number of data parameters for a large number of customers. In an exemplary embodiment, data is stored in the data warehouse 108 in one or more databases. A database can be any type of database that can be queried, including a relational or flat file database. A database, in general, is a collection of tables, each storing information on related fields or columns, each of which represents a particular attribute. A table could have a large number of rows with each row containing values for the columns/attributes of the table. A query, in general, is a mechanism by which a user performs various operations on the database, such as retrieving information or updating data to the tables.

In one embodiment, data warehouse 108 may have a model driven architecture. A model is a domain-specific representation of the information that the data warehouse 108 stores. Domain logic adds meaning to raw data, which in one embodiment is the data stored in data warehouse 108. A model driven architecture is a structure in which a business model, expressed in a modeling language drives the generation of the resulting database structure. One example of a model driven architecture is the Object Management Group (OMG) model driven architecture. The model is typically expressed in a descriptive grammar. For example, the model may be expressed in extensible markup language (XML) which includes tags and descriptors for the model. Other forms of expression can be used however, such as a simple Tag=value specification or through the definition of a set of keywords.

Figure 2:
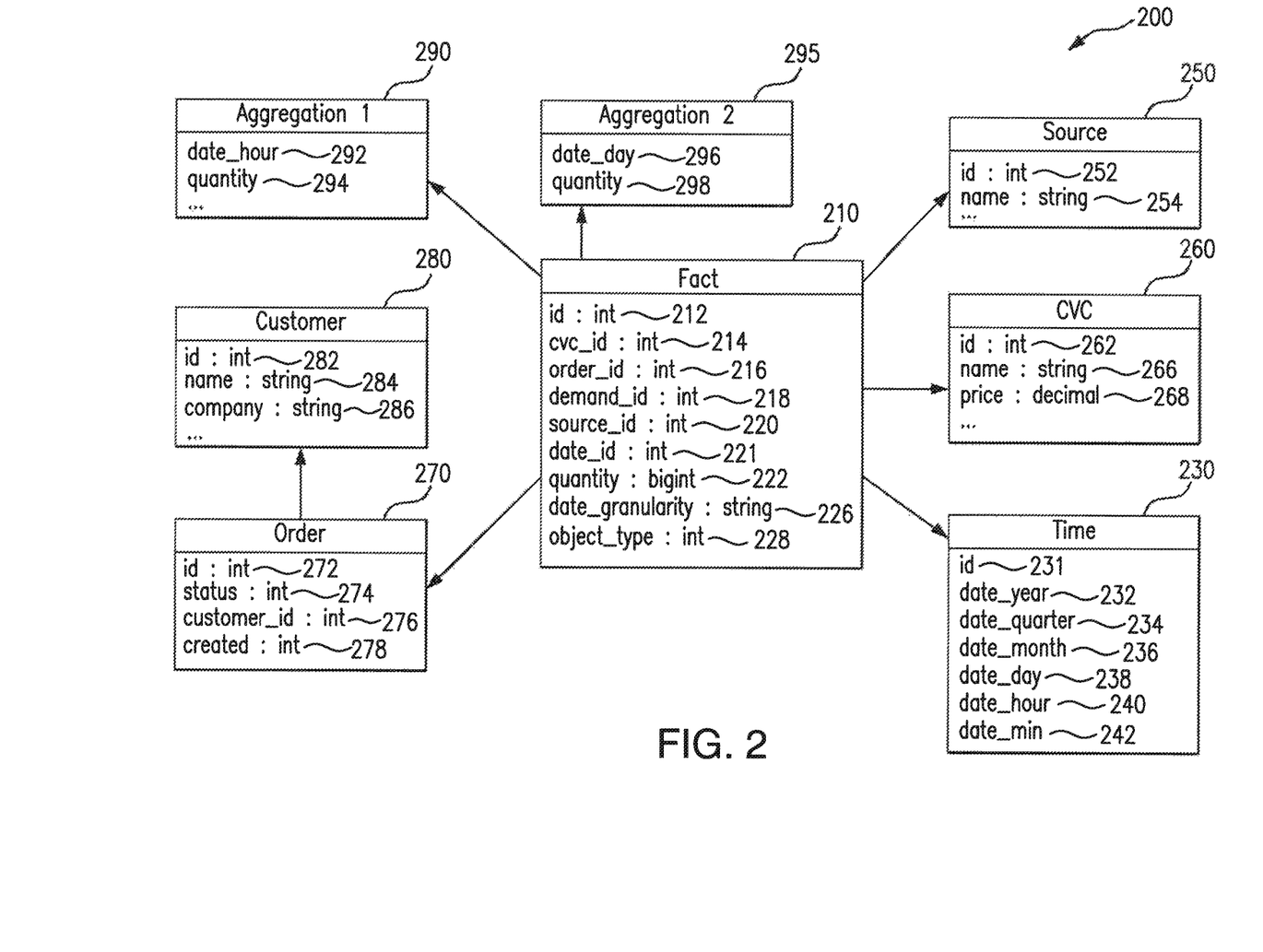
FIG. 2 shows a simplified data model as used in an illustrative embodiment of the present invention.

A simplified data model underlying one exemplary embodiment is illustrated in FIG. 2. FIG. 2 is only meant to be illustrative of the multidimensional star schema organization of the data warehouse 108. In one embodiment, information relevant to an exemplary data warehouse system may primarily include line items representing, e.g., sales orders, customer demands, delivery promises, and the like. These types of transaction data may be consolidated in one table with an object type column for identification, forming the fact table 210 in the exemplary schema 200.

The schema 200 classifies the attributes of an event into facts 210 (e.g., measured numeric/time data) and descriptive dimension attributes 230, 250, 260, 270, 280 (e.g., time, product id, customer name, sale date) that provide the facts with content. The exemplary fact table 210 holds metric values recorded for a specific event. The fact table 210 may hold a very large number of entries (billions). Special care is taken to minimize the number and size of attributes in order to constrain the overall fact table 210 size and maintain performance. Dimension tables 230, 250, 260, 270, 280 usually have few entries compared to fact tables 210, but they may have a very large number of attributes that describe the fact data.

Each entry in the fact table 210 is uniquely identifiable by its id 212. An entry in the fact table 210 may be, according to its object_type 228. A product may be represented by its characteristic value combination (CVC) allowing for unique identification. For this purpose, the cvc_id 214 is stored in the fact table 210 and the features specific for the product, such as name 266 and price 268, are stored in a corresponding CVC dimension table 260. In the fact table 210, there may also be a quantity column—quantity 222. Some data, such as time 230, specific orders 270, the customer 280 who ordered the product, and the source 250 of an input—be it a production plant or a supplier—is stored in dimension tables. The fact table entries make reference to the entries of the dimension tables directly (order_id 216, cvc_id 214; source_id 220; and date_id 221) or at least indirectly (customer_id 276 via the order_id 216). An entry of the Time table 230, uniquely identifiable by means of its id 231, may indicate the attributes: date_year 232, date_quarter 234, date_month 236, date_day 238, date_hour 240, and date_minute 242. An entry of the Source table 250, uniquely identifiable by means of its id 252, may indicate the attribute name 254. An entry of the CVC table 260, uniquely identifiable by means of its id 262, may indicate the attributes: name 266, and price 268. An entry of the Order table 270, uniquely identifiable by means of its id 272, may indicate the attributes: status 274, customer_id 276, and created 278. An entry of the Customer table 280, uniquely identifiable by means of its id 282, may indicate the attributes: name 284 and company 286. Finally, an entry of the fact table further indicates the attribute date_granularity 226.

As a typical feature of a star schema, most columns in the fact table are foreign keys (such as cvc_id 214, order_id 216, demand_id 218, source_id 220, and date_id 221) to dimension tables 250, 260, 270, 280, 230. It can be expected that the content of the majority of dimension tables (such as tables 250, 260, 270, 280) is relatively static. Changes to these tables may be necessary if the company introduces a new product or if goods are purchased from a new supplier, for example. As a consequence, the total volume of data may be reduced by storing recurring information in dimension tables 250, 260, 270, 280.

Additionally, exemplary aggregation tables 290 and 295 are illustrated in FIG. 2. In a typical star schema, aggregation tables 290 and 295 are summary tables that contain the results of aggregation. Typically, summary tables are designed by warehouse system architects who attempt to anticipate the data aggregations that the users will request, and then pre-build such tables. In the example illustrated in FIG. 2, the aggregation tables 290, 295 are generated over the "time" dimension storing aggregated quantity 294, 298 data for "hour" (attribute date_hour 292) and "day" (attribute date_day 296) time periods as shown in FIG. 2. Aggregation tables 290 and 295 are in essence additional fact tables of higher levels. They are attached to the fact table 210. It is noted that in various embodiments there may be hierarchies among aggregation tables 290, 295 because users at different levels of management may require different levels of summarization. As previously indicated, aggregation tables 290, 295 containing pre-aggregated results typically provide for improved query response time with respect to on-the-fly aggregation.

Figure 3:
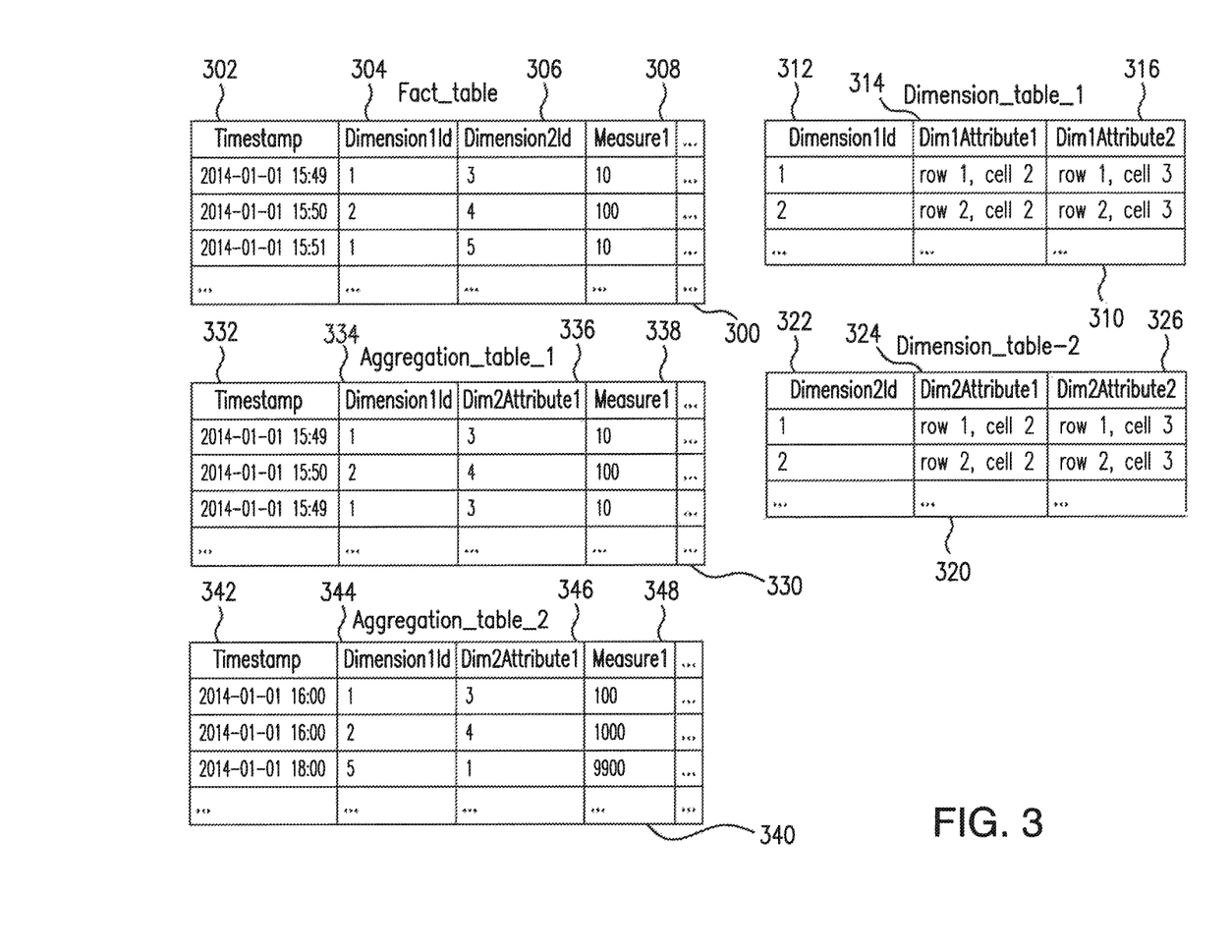
FIG. 3 is a simplified example of tables within a data warehouse, in accordance with an illustrative embodiment of the present invention.

FIG. 3 is a simplified example illustrating another arrangement of data within tables within data warehouse 108, in accordance with an illustrative embodiment of the present invention. In this embodiment, the data warehouse 108 may be employed to store performance characteristics of wireless networks, for example. Measurements of network quality on a wireless network for a single point in space but with measurements separated in time often vary as well. According to this illustrative embodiment, a plurality of data collection agents may be deployed in the network infrastructure. This plurality of data collection agents may be configured to send the collected data to data management server 104. The collected data may pertain, for example, to specific network interface devices and the activity occurring on each including name, manufacturer, hardware version, firmware version, driver version, phone number, maximum technology capability, technology used, home carrier, active carrier, cell tower ID, signal strength, transport layer retries, MTU (Maximum Transmission Unit) sizes, packet loss, latency, jitter, and efficiency, among others.

In this example, data warehouse 108 is organized in a star schema. In the star schema a centralized fact table 300 is connected to multiple dimension tables, represented in FIG. 3 by a first dimension table 310 and a second dimension table 320. Each dimension table represents a data dimension of the data warehouse 108. For example, the dimension represented by the first dimension table 310 may include subscriber information. The dimension represented by the second dimension table 320 may include mobile device information. A typical data warehouse may be much more complex than is shown in FIG. 3 while still conforming to the overall star schema represented in FIG. 3.

As shown in FIG. 3, each data entry in the fact table 300 may reference one or more dimension identifiers (DIM IDs) into a dimension table data entry. For example, Dimension1Id 304 attribute of the fact table 300 references (as a foreign key) DIM ID 312 of the first dimension table 310. Dimension2Id 306 attribute of the fact table 300 references DIM ID 322 of the second dimension table 320. An entry of the first dimension table 310, uniquely identifiable by means of its DIM ID 312, may indicate additional attributes: Dim1Attribute1 314 and Dim1Attribute2 316. An entry of the second dimension table 320, uniquely identifiable by means of its DIM ID 322, may indicate the attributes: Dim2Attribute1 324 and Dim2Attribute2 326.

In one embodiment of the present invention, the fact table 300 may store time-series data. Time-series data is data that is associated with particular points in time or particular time intervals, often represented in the form of time stamps that are maintained with the data. In many situations, in order to allow historical analysis to occur, it may be desirable to collect the time-series data generated by a system of interest, such as network monitoring system, and store the data in the fact table 300 of data warehouse 108. As shown in FIG. 3, for time-series data each entry in the fact table 300 may include a time stamp 302 being indicative of the time each data entry is generated.

As previously mentioned, data warehouses, such as data warehouse 108, are often organized to provide operational level reporting. Key performance indicators, such as but not limited to network performance characteristics, are represented in fact table 300 of FIG. 3 by a Measure1 attribute 308.

Because the fact table 300 of data warehouse 108 may hold a very large number of entries (billions), the overhead and processing time required to assemble reports on key performance indicators 308 can be very high. To reduce the processing time and overhead for producing such key performance indicators 308, rollup aggregations can be performed for time-series data. Consequently, data warehouse 108 can include a plurality of aggregation tables, such as first aggregation table 330 and second aggregation table 340.

Figure 4:
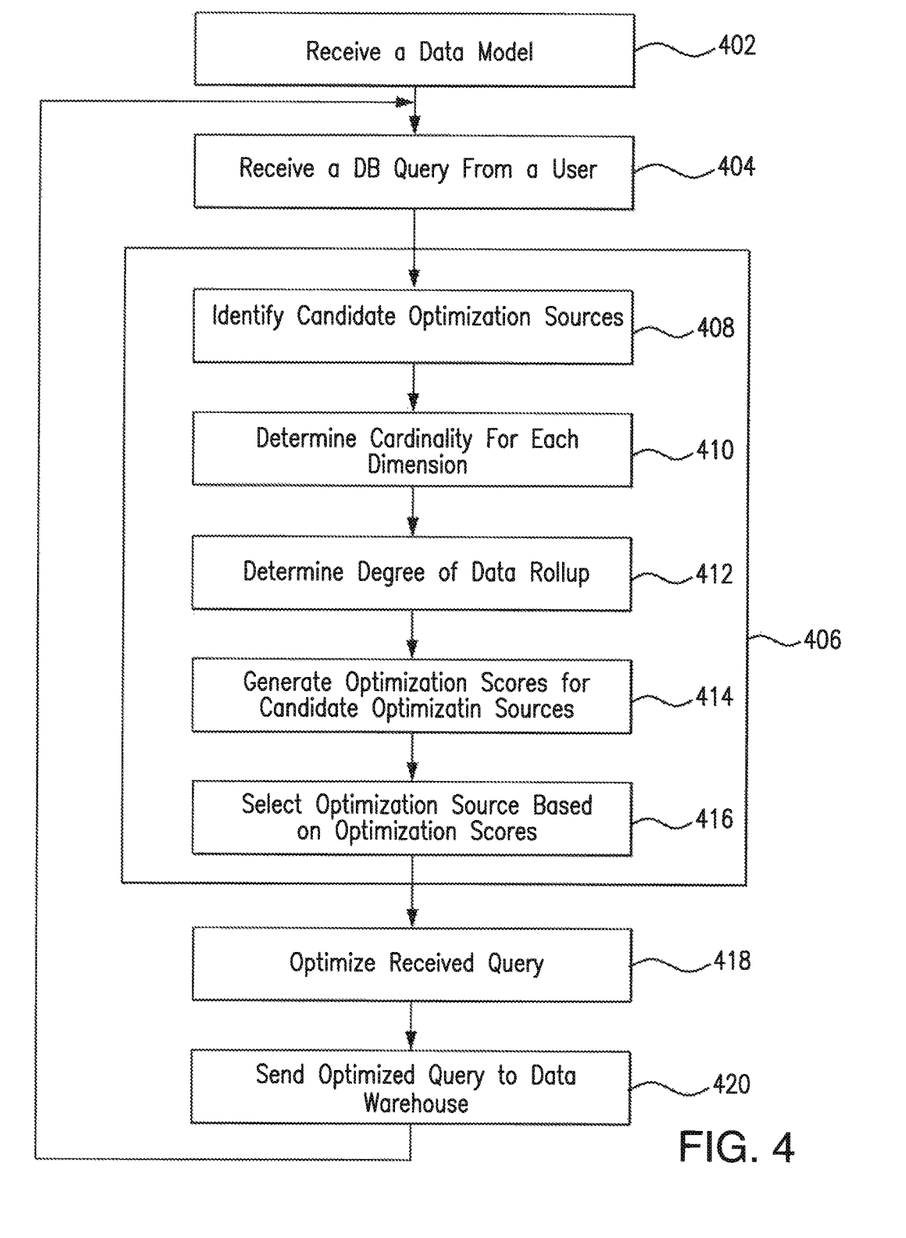
FIG. 4 is a flowchart of operational steps of the query optimizer module of FIG. 1, in accordance with an illustrative embodiment of the present invention.

Aggregation tables 330 and 340 may be used to aggregate collected data in accordance with pre-defined aggregation rules (e.g., time period) to meet specific reporting needs. As illustrated in FIG. 4, time-series data aggregated in tables 330 and 340 may be associated with particular points in time or particular time intervals using time stamps 332 and 342. In addition to time stamps 332 and 342, each rollup aggregation table 330, 340 may include DIM IDs 334, 344 and other performance indicators attributes 336, 346 associated with corresponding measures 338 and 348. For example, the first aggregation table 330 may hold second dimension data rolled up to a single attribute (Dim2Attribute1) 336 aggregated over same time period as fact table 300, while the second aggregation table 340 may hold second dimension data rolled up to a single attribute (Dim2Attribute1) 346 aggregated over a one hour time period, and so on.

FIG. 4 is a flowchart of operational steps of the query optimizer module 106 of FIG. 1, in accordance with exemplary embodiments of the present invention. Before turning to description of FIG. 4, it is noted that the flow diagram shown therein is described, by way of example, with reference to components shown in FIG. 3, although these operational steps may be carried out in any system and are not limited to the scenario shown in the aforementioned figure. Additionally, the flow diagram in FIG. 4 shows example in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

The query optimizer 106 may generally be a software module or application that determines the most efficient way to execute an input query. At 402, the query optimizer 106 preferably parses a data model received from other components of data management server 104 or from the data warehouse 108. The model is typically expressed in a descriptive grammar. For example, the model may be expressed in extensible markup language (XML) which includes tags and descriptors for the model. In one embodiment, the model may define one or more fact tables 300, dimension tables 310, 320 and one or more aggregation rules, which in turn define rollup aggregations stored in one or more aggregation tables 330 and 340.

Next, at 404, the query optimizer 106 may receive a query request from a user (e.g., a user of client computer 102) to execute a particular query. In a particular non-limiting example, the received query (1) may have the following SQL format:

```
SELECT dimension1id, dim2attribute1, sum(measure1)
FROM fact_table f join dimension2 d on f.dimension2id=d.dimension2id
WHERE timestamp >= to_date('01-01-2014 15:45', 'DD-MM-YYYY HH24:MI') and
timestamp < to_date ('01-01-2014 15:59', 'DD-MM-YYYY HH24:MI) group by
dimension1id, dim2attribute1.
```

It is noted that received query may include at least one predicate. According to an embodiment of the present invention, a predicate can include data to limit a data set against which conditions are to be evaluated and may include at least one of identity of specific users, identity of groups of users, identity of devices operating in a defined geographic area, specific days of the week or times of the day, and identity of devices experiencing specific operating environments such as a signal strength above or below a particular threshold for a particular period of time, among others.

At 406, the query optimizer 106 may analyze the query received at 404 to determine whether this query can be optimized. More specifically, in one embodiment of the present invention, the query optimizer 106 may evaluate one or more query predicates to determine whether the received query can be optimized by targeting one or more aggregation tables 330, 340 instead of the fact table 300 as a source of data. Various criteria may be used to identify queries that can be rewritten in an optimized form and to identify tables that may serve as optimized data sources. These criteria can include but not limited to, application of aggregation function, application of time-series data truncation (e.g., rounding time stamps to "HOUR" or "DAY"), elimination of one or more dimension, rollup of data to specific attributes of some dimensions, time period alignment, and the like. In one embodiment, this query evaluation process may involve multiple steps, such as steps 408-416 described below.

In response to determining that the received query can be optimized, at 408, the query optimizer 106 may identify one or more candidate optimization sources. These candidate optimization sources may comprise a set of one or more tables that may be used for query rewrite purposes. In one embodiment of the present invention, the query optimizer 106 may identify one or more candidate optimization sources by first parsing the received query. For example, the query optimizer 106 may determine all database tables and columns to be accessed by the received query, whether the query comprises either implicit or explicit join statement and may also evaluate one or more query predicates. Tables are joined by pairwise association of columns between the tables. Joins allow additional information to be obtained across tables in a meaningful way so that data in one table may explain or clarify data in another table. Continuing with the illustrative example above, by parsing query (1), the query optimizer 106 determines that query (1) comprises a single query statement to jointly select and present data from the fact table 300 (dimension1id 304) and second dimension table 320 (dim2attribute1 324) and that query predicates refer to a fifteen minute time period between '01-01-2014 15:45' and '01-01-2014 15:59'.

As a next step in identification of candidate optimization sources, the query optimizer 106 may determine whether any of the other tables included in the model may hold the requested data. More specifically, the query optimizer 106 may consider both the first aggregation table 330 and the second aggregation table 340. Since both first aggregation table 330 and second aggregation table 340 include dimension1id 334 and 344, respectively, as one of the table attributes, the query optimizer 106 may include both aggregation tables 330 and 340 into a set of candidate optimization sources requiring further analysis.

At 410, the query optimizer 106 preferably estimates cardinality for each aggregation table dimension relevant to the received query (1). As used herein, the term "cardinality" refers to the number of distinct values. It is noted that in various data warehouse environments, dimensions may arise that have cardinality at or near the cardinality of the fact data. For instance, in a wireless network monitoring data warehouse, the dimension attribute "mobile device" would likely have a unique ID number for every mobile device stored in the data warehouse 108. This is in contrast to other dimension attributes such as, for instance, the "region of the country" in which the device was purchased. The region would be limited to a much smaller cardinality, such as five regions for the entire United States (e.g., Northeast, Southeast, Midwest, South, and West), for example. Thus, if dimension1id 334, 344 represents the mobile device dimension, cardinality may be equal to 100 million, for example, whereas the region dimension will have a cardinality of five. In other words, at 410, the query optimizer 106 may determine whether any of dimension1id 334, 344 and dim2attribute1 336 and 346 attributes of the first 330 and second 340 aggregation tables represent a high-cardinality dimension.

Next, at 412, the query optimizer 106 may calculate a degree of each data rollup (i.e., time series rollup). For instance, the query optimizer 106 may determine that the first aggregation table 330 matches the required dimension rollups (e.g., data rollup to attribute on dim2attribute1 336) and has the required time period resolution associated with time-series rollup (i.e., matching the degree of time-series rollup in the fact table 300). On the other hand, the query optimizer 106 may determine that even though the second aggregation table 340 also matches the required dimension rollups (e.g., data rollup to attribute on dim2attribute1 346), the time period resolution for time series data stored in the second aggregation table 340 does not match the 15 minute period required by the query (1) predicates because in the second aggregation table 340 data is aggregated over a one hour time period.

At 414, the query optimizer 106 may generate optimization scores for each of the candidate optimization sources based, at least in part, on estimated dimension cardinalities and degrees of data rollup determined at 410 and 412. An optimization score is a computed value associated with a particular candidate table. In one embodiment, the optimization score may comprise a weighted sum of the plurality of metrics related to query optimization. In one embodiment, low scores may indicate that the particular candidate meets the optimization criteria well, and high scores may indicate that the particular candidate meets the optimization criteria poorly. For example, the optimization score generated by the query optimizer 106 for the first aggregation table 330 may be lower than the optimization score generated for the second aggregation table 340 due to the time-period mismatch described above. At 416, the query optimizer 106 may select one of the candidate optimization sources (i.e., aggregation tables) based on the assigned optimization scores. For instance, the query optimizer 106 may select the first aggregation table 330 because it has the lowest optimization score. It should be appreciated that in some embodiments some of the query evaluation steps 408-416 described above may be combined into a single step. In some embodiments, one or more steps may be omitted and/or one or more additional steps may be included.

At 418, the query optimizer 106 may optimize the query received at 404. In one embodiment, the query optimizer 106 may rewrite the query so that it can be executed more efficiently. Continuing with the above example, the query (1) can be rewritten as the following query (2):

```
SELECT dimension1id, dim2attribute1, sum (measure1)
FROM aggregation_table_1
WHERE timestamp >= to_date ('01-01-2014 15:45', 'DD-MM-YYYY HH24:MI') and
timestamp < to_date ('01-01-2014 15:59', 'DD-MM-YYYY HH24:MI') group by
dimension1id, dim2attribute1.
```

It should be appreciated that optimized query (2) targets first aggregation table 330, selected by the query optimizer 106 at 416, in order to avoid expensive join operation included in query (1). This query optimization should result in more efficient query execution in the data warehouse 108. Thus, once the received query is optimized (rewritten), the query optimizer 106 preferably transmits the optimized query (2) to the data warehouse 108 instead of the original query (1) received from a user. It is noted that the query optimizer 106 may repeat the query receiving/processing steps 404-420 for subsequently received queries.

In summary, various embodiments of the present invention describe a query optimization approach that addresses problems faced when configuring rollup aggregations in a data warehouse environment having a model driven architecture without adding any significant overhead. Advantageously, in a preferred embodiment, the query optimizer 106 employs a mechanism for providing optimized data access by means of targeted query rewriting, while retaining full application flexibility. Various embodiments of the present invention introduce a new approach aimed at improving performance of model-based data warehouse systems by utilizing dynamic data model changes in real time without requiring any additional configuration and/or user interface changes.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of query optimization may be implemented or executed by centralized data management servers comprising one or more computer systems. One such data management server 104 is illustrated in FIG. 5. In various embodiments, data management server 104 may be a server, a mainframe computer system, a workstation, a network computer, a desktop computer, a laptop, or the like.

Data management server 104 is only one example of a suitable system and is not intended to suggest any limitation as to the scope of use or functionality of embodiments of the invention described herein. Regardless, data management server 104 is capable of being implemented and/or performing any of the functionality set forth hereinabove.

Data management server 104 may be described in the general context of computer system-executable instructions, such as program modules, being executed by a computer system. Generally, program modules may include routines, programs, objects, components, logic, data structures, and so on that perform particular tasks or implement particular abstract data types. Data management server 104 may be practiced in distributed data processing environments where tasks are performed by remote processing devices that are linked through a communications network. In a distributed data processing environment, program modules may be located in both local and remote computer system storage media including memory storage devices.

Data management server 104 is shown in FIG. 5 in the form of a general-purpose computing device. The components of data management server 104 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Data management server 104 typically includes a variety of computer system readable media. Such media may be any available media that is accessible by data management server 104, and it includes both volatile and non-volatile media, removable and non-removable media.

System memory 528 can include computer system readable media in the form of volatile memory, such as random access memory (RAM) 530 and/or cache memory 532. Data management server 104 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 515, such as query optimizer 106, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 515 generally carry out the functions and/or methodologies of embodiments of the invention as described herein.

Data management server 104 may also communicate with one or more external devices 514 such as a keyboard, a pointing device, a display 524, etc.; one or more devices that enable a user to interact with data management server 104; and/or any devices (e.g., network card, modem, etc.) that enable data management server 104 to communicate with one or more other computing devices. Such communication can occur via Input/Output (I/O) interfaces 522. Still yet, data management server 104 can communicate with one or more networks such as a local area network (LAN), a general wide area network (WAN), and/or a public network (e.g., the Internet) via network adapter 520. As depicted, network adapter 520 communicates with the other components of data management server 104 via bus 518. It should be understood that although not shown, other hardware and/or software components could be used in conjunction with data management server 104. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for optimizing data access in a data warehouse having a model driven architecture, the method comprising:
   receiving an Object Management Group (OMG) data model for storing time series measurement data representing a plurality of dimensions and measurements, the OMG data model having one or more aggregation tables, and wherein the OMG data model defines at least one of one or more fact tables, one or more dimension tables, and one or more aggregation rules defining data rollup aggregations in the one or more aggregation tables;
   receiving a query from a user, the query having one or more predicates, wherein the one or more predicates include data to limit a data set against which conditions are to be evaluated and wherein the one or more predicates include at least one of user identity, user group identity, identity of devices operating in a predefined geographic area, identity of devices experiencing specific operating environments above or below a predefined threshold for a predefined period of time;
   identifying one or more candidate optimization sources, wherein the one or more candidate optimization sources comprise one or more aggregation tables;
   determining, by the processor, cardinality for each dimension stored in each of the one or more identified candidate optimization sources;
   determining, by the processor, a degree of data rollup for each of the one or more identified candidate optimization sources;
   generating an optimization score for each of the one or more identified candidate optimization sources based, at least in part, on the determined cardinality and the determined degree of data rollup;
   selecting, by the processor, one candidate optimization source from the one or more identified candidate optimization sources based on the generated optimization score; and
   optimizing, by the processor, the received query using the one or more aggregation tables, in response to selecting the one candidate optimization source.

2. The method of claim 1, wherein optimizing the received query comprises rewriting the received query using the one or more aggregation tables.

3. The method of claim 1, further comprising sending the optimized query to the data warehouse.

4. The method of claim 1, wherein the one or more candidate optimization sources are identified based on the aggregation rules.

5. The method of claim 1, wherein the one or more candidate optimization sources are identified based on truncation of time series measurement data stored in the one or more aggregation tables.

6. The method of claim 1, wherein at least one of the one of the one or more query predicates specifies a time period and wherein the one or more candidate optimization sources are identified based on the specified time period.

7. A computer program product for optimizing data access in a data warehouse having a model driven architecture, the computer program product comprising:
   one or more computer-readable storage devices and a plurality of program instructions stored on at least one of the one or more computer-readable storage devices, the plurality of program instructions comprising:
   program instructions to receive an Object Management Group (OMG) data model for storing time series measurement data representing a plurality of dimensions and measurements, the OMG data model having one or more aggregation tables, and wherein the OMG data model defines at least one of one or more fact tables, one or more dimension tables, and one or more aggregation rules defining data rollup aggregations in the one or more aggregation tables;
   program instructions to receive a query from a user, the query having one or more predicates, wherein the one or more predicates include data to limit a data set against which conditions are to be evaluated and wherein the one or more predicates include at least one of user identity, user group identity, identity of devices operating in a predefined geographic area, identity of devices experiencing specific operating environments above or below a predefined threshold for a predefined period of time;
   program instructions to identify one or more candidate optimization sources, wherein the one or more candidate optimization sources comprise one or more aggregation tables;
   program instructions to determine cardinality for each dimension stored in each of the one or more identified candidate optimization sources;
   program instructions to determine a degree of data rollup for each of the one or more identified candidate optimization sources;
   program instructions to generate an optimization score for each of the one or more identified candidate optimization sources based, at least in part, on the determined cardinality and the determined degree of data rollup;

program instructions to select one candidate optimization source from the one or more identified candidate optimization sources based on the generated optimization score; and program instructions to optimize the received query using the one or more aggregation tables, in response to selecting the one candidate optimization source.

8. The computer program product of claim 7, wherein the program instructions to optimize the received query comprise program instructions to rewrite the received query using the one or more aggregation tables.

9. The computer program product of claim 7, further comprising program instructions to send the optimized query to the data warehouse.

10. The computer program product of claim 7, wherein the one or more candidate optimization sources are identified based on the aggregation rules.

11. A computer system for optimizing data access in a data warehouse having a model driven architecture, the computer system comprising one or more processors, one or more computer-readable storage devices, and a plurality of program instructions stored on at least one of the one or more storage devices for execution by at least one of the one or more processors, the plurality of program instructions comprising:

program instructions to receive an Object Management Group (OMG) data model for storing time series measurement data representing a plurality of dimensions and measurements, the OMG data model having one or more aggregation tables, and wherein the OMG data model defines at least one of one or more fact tables, one or more dimension tables, and one or more aggregation rules defining data rollup aggregations in the one or more aggregation tables;

program instructions to receive a query from a user, the query having one or more predicates, wherein the one or more predicates include data to limit a data set against which conditions are to be evaluated and wherein the one or more predicates include at least one of user identity, user group identity, identity of devices operating in a predefined geographic area, identity of devices experiencing specific operating environments above or below a predefined threshold for a predefined period of time;

program instructions to identify one or more candidate optimization sources, wherein the one or more candidate optimization sources comprise one or more aggregation tables;

program instructions to determine cardinality for each dimension stored in each of the one or more identified candidate optimization sources;

program instructions to determine a degree of data rollup for each of the one or more identified candidate optimization sources;

program instructions to generate an optimization score for each of the one or more identified candidate optimization sources based, at least in part, on the determined cardinality and the determined degree of data rollup;

program instructions to select one candidate optimization source from the one or more identified candidate optimization sources based on the generated optimization score; and program instructions to optimize the received query using the one or more aggregation tables, in response to selecting the one candidate optimization source.

12. The computer system of claim 11, wherein the program instructions to optimize the received query comprise program instructions to rewrite the received query using the one or more aggregation tables.

13. The computer system of claim 11, further comprising program instructions to send the optimized query to the data warehouse.

* * * * *